Sept. 19, 1939.　　　　　J. A. KLOD　　　　　2,173,366
CUTTER AND BLADE THEREFOR
Filed June 25, 1937
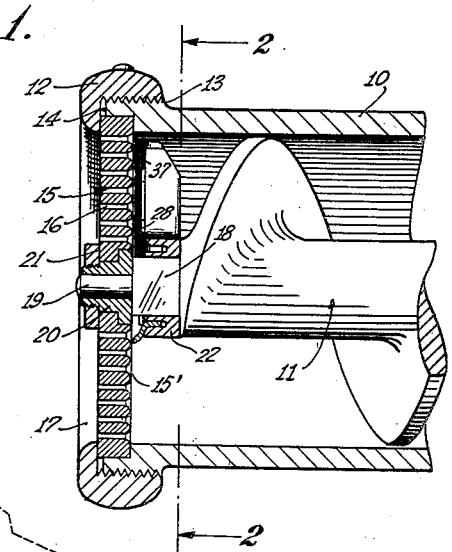
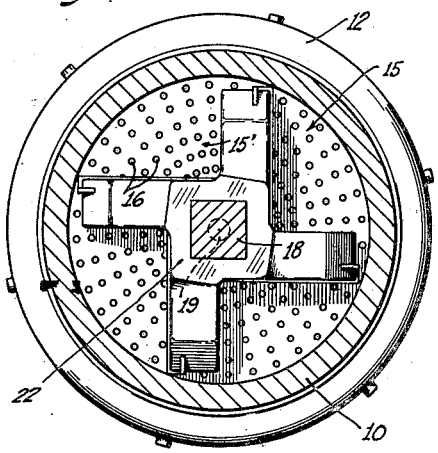
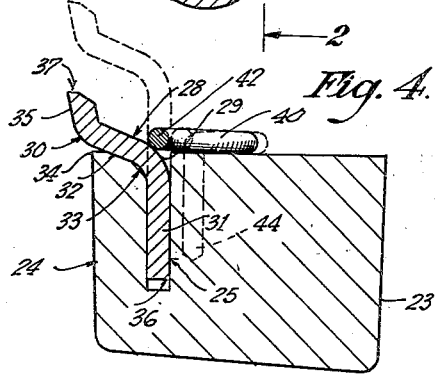
John A. Klod
INVENTOR.
BY Clarence E. Threedy
HIS ATTORNEY.

Patented Sept. 19, 1939

2,173,366

UNITED STATES PATENT OFFICE 2,173,366

CUTTER AND BLADE THEREFOR

John A. Klod, Chicago, Ill.

Application June 25, 1937, Serial No. 150,225

4 Claims. (Cl. 146—189)

This invention relates to cutting devices and to an improved form of cutter and blade therefor especially suitable for use with meat cutting and grinding devices.

Among its important objects the invention includes the provision of elongated blades crimped or bent longitudinally in wavy form and means in the form of a holder having a square hub and projecting arms each aligned with a side of the square and each provided with channels in which the blades are seated.

The invention further contemplates the offsetting of the cutting edge of the blade so that the same will lead the holder arm in which it is seated, thus avoiding the possibility that the holder arms may sweep the substance to be cut out of the path of the blade when the arm is rotated.

Still another object is the provision in a cutter, such as characterized above, of formations in each blade receivable in a notch formed by the intersection of the several blade receiving channels and preventing longitudinal movement of the blade, and yieldable means for holding the blade against movement laterally out of its seat.

Still another object is the provision in a device of the class described of a longitudinally crimped blade adapted to be received in an elongated channel in the cutter arm in a manner providing a degree of resiliency of the blade as it moves over the cutting block, while assuring that the blade cannot accidentally be dislodged while the machine is in operation.

Yet another object is the provision of a cutter blade of substantially thin section and bent or crimped longitudinally to form a blade of somewhat S-like section, together with means for mounting the blade in a rotatable member with the cutting edge disposed in advance of the holding member.

Other objects and novel aspects of construction and operation of the device will appear as the following description proceeds in view of the drawing in which:

Fig. 1 is a fragmentary vertical section of the feed arm and cutting mechanism in a preferred embodiment of the invention;

Fig. 2 is a front vertical section of the cutting block and cutter as viewed along lines 2—2 of Fig. 1;

Fig. 3 is an enlarged plan of the cutter or holder and blades mounted therein;

Fig. 4 is an enlarged sectional fragment along lines 4—4 of Fig. 3 and illustrates the peculiar section of the blade and means resiliently mounting the same;

Fig. 5 is an enlarged irregular section through the cutter as viewed along the broken line 5—5 of Fig. 3;

Fig. 6 is an enlarged perspective detail of a presser spring; while

Fig. 7 is an enlarged perspective detail of a modified form of presser spring.

The present invention contemplates certain modifications over various features of cutting members and holders shown and described in United States Letters Patent 1,869,218, 1,869,219 and 1,869,220 granted to me on July 26, 1932.

As viewed in Fig. 1, my improved cutting device is adapted for use in a cutting machine having a tubular or sleeve-like feed arm 10 in which is mounted for rotation a stock feeding worm or conveyor 11 adapted to be rotated by any suitable means, either manually or power driven. At its outer left-hand end the sleeve 10 is provided with a mounting ring 12 having an internal thread receiving a threaded end portion 13 of the feeding tube or sleeve 10. A ledge or annular recess 14 is provided in the end portion of the tube 10, in which may be seated an annular cutting block 15 provided with a plurality of openings 16 through which the cut stock is ejected. The mounting ring 12 has an inner flange 17 which overlies the cutting block 15 adequately to prevent removal of the latter from its seat in the end of the feeding sleeve.

In the present embodiment of the invention, the conveying worm 11 has a square collar 18 provided near its outer or left-hand end and from which extends a stud shaft 19 seated in a bushing 20 seated in the cutting block 15 and secured thereto by a nut 21. The cutting member has a square hub which is adapted to fit upon the square collar 18 so as to key the cutter for rotation with the conveyor worm.

As viewed particularly in Fig. 3, the cutter or blade holder includes a body having an open central hub portion 22 in the form of a square. Extending in a radial sense from the hub are a plurality of arms 23, each having a leading edge portion 24 extended in parallel with the adjoining side of the square hub opening. Formed around the square hub portion 22 are intersecting slots or channels 25, each of which is extended as at 26 into an adjoining arm. Thus the slots are arranged progressively around the holder, there being one slot for each arm on each side of the square hub and extending in parallelism with said side of the hub and the corresponding leading edge of the arm.

It will be observed in Figs. 3 and 5 that the intersection of the several channels or slots 25 with one another occurs at the corners of the square hub and provides a short slot 27 which extends laterally away from one of the two intersecting channels 25 and in effect provides a niche in the wall of one of the channels, the purpose and importance of which will shortly appear.

The improved blades 28 are in the form of relatively thin elongated pieces of steel having double reverse bends 29 and 30 along lines parallel to their long axes resulting in a blade which is of somewhat S shape in cross section (Fig. 4).

The bend 29 is much wider than the bend 30 and is made somewhat close to the center line of the blade and results in a relatively wide flat section 31 which is adapted to fit in the channel 25 with a face portion 32 of the opposite side or half of the blade fitting against a beveled edge portion 33 of the channel 25. The shorter bend 30 is made along a line close to the underlying leading edge 24 of the arm 23, and the short upper or outer portion of the blade 35 is extended at an angle adequate to bring it somewhat in advance of the underlying leading edge 24 of the cutter arm.

It is important to observe in Fig. 4 that the depth of the channel 25 is adequate to provide a clearance between the bottom or inner edge 36 of the cutter blade. It will be apparent that if a force is applied to the cutting edge 37 of the blade along a line either parallel to the wide base 31 thereof or in a direction obliquely toward the face 31 that the tendency of the blade will be to recede into the channel 25, the clearance between the bottom of which and the edge 36 of the blade permitting such movement. In addition, the angular disposition of the narrower face of the blade which overlies the beveled edge 33 of channel 25 bears against that portion of the arm lying between the channel and the leading edge 34 so that force applied to the blade in certain directions will be distributed variously throughout the blade and in various components, as will readily appear from an inspection of Fig. 4. One of the immediate advantages of this arrangement obviously is the increased strength and rigidity of the blade with regard to forces properly applied along the cutting edge 37. Another advantage lies in the fact that there is a degree of flexibility or yield provided by the bend 29 (and to an extent, the bend 30) by virtue of which certain undesirable components of force may be compensated to relieve undue strain on the blade and its holding means. For example, a component of force applied in the region of the bend 30 in the direction of the leader arrow would tend to urge the lower edge of the blade 36 toward the bottom of the channel 25 and also tend to flex the blade along the bend 29. While the blades are preferably well tempered and intended to have a certain degree of rigidity, yet the shape of the blade and the particular arrangement of the channels provide a mounting in which advantage is taken of the slightest flexing or tendency of the blade to flex or yield or move in any manner and particularly as suggested above.

Each of the blades 28 has formed in the wide half or side section 31 thereof between its ends, an extrusion or extending lug 38 (Figs. 3 and 5) which is dimensioned to fit into the notch 27 formed by the intersection of channels 25 in each of the arms 23.

When the blade is inserted in the channel, the extrusion or crimp 38 is simply dropped into the notch portion 27 from above as the lower edge 36 of the blade is pressed downwardly into the channel 25, and when the blade is seated it will be apparent that sliding motion in the direction of its long axis is rendered impossible by the lug 38.

In order to prevent accidental withdrawal of the blades laterally of the channels, there are provided yieldable presser members 40 (Fig. 6) mounted in each of the arms. These presser members are preferably formed from spring wire and are bent and have two substantially parallel legs 41 joined by a bight portion 42 having opposite spring bends 43 at its junctures with the legs, the latter being bent at right angles to the plane of the bight 42 and spring bends 43. As seen in Fig. 3, these presser members are mounted, one on each arm, by inserting the legs 41 in spaced holes 44 in each of the arms with the bight portion 42 projecting slightly across the several channels 25 so as to be engaged by the bend portion 29 of the blade when the latter is dropped into the channel and pushed downwardly with sufficient force to flex the presser 40 to permit the blade to fully seat. Thereafter the bight portion 42 will spring back into normal position and project a sufficient distance laterally across the blade channel to prevent casual withdrawal of the blade therefrom. However, by exertion of an amount of pull the blade will flex the spring out of position and may thus readily be withdrawn from its seat.

A modified form of presser 40' is shown in Fig. 7 and is similar in most respects to that of Fig. 6 except that it has only one leg 41' which is receivable into one of the holes 44, the other hole 44 of each pair being occupied by a stud 45 against which the free end portion 46 of the presser 40' bears to provide a stop when the curved face or bend portion 29 of the blade bears against the bight portion 42' when the blade is seated in the manner described in conjunction with the presser of Fig. 6.

By providing yieldable means for preventing the movement of the blades laterally out of their seats or channels, the cutter heads may readily be handled and applied or removed from various cutting machines without danger of the blades unseating.

In operation the several blades 28 are dropped into their respective receiving channels 25 in the manner just described and pressed into seated position past their respective presser springs 40 or 40', and the holder or cutter body is slipped into the square collar 18 on the feed screw 11 with the cutting edges 37 of the blades facing outwardly of the feed tube or arm 10. Thereafter the apertured cutting head 15 is fitted into its seat in the end of the tube, and the mounting ring or collar 12 is threaded into place and moves the inner face 15' of the cutting head or block firmly against the edges of the several knives 28, the latter being free to recede into their respective channels 25 responsive to the presure of the blade 15 bearing against them.

The foregoing arrangement, in addition to the advantages already pointed out, is characterized by another very important advantage in that the cutting head may be pressed much more firmly against the blades than was practicable in certain prior arrangements, particularly in the case of power driven machines where considerable heat is generated by the movement of the knives over the face of the cutting block. This arrangement further makes possible an automatic take-up of limited amounts of play between the blade and the face of the cutting block as a result of wear.

It is thought that those skilled in the art will readily recognize and understand the advantages residing in the invention, some of which have been particularly pointed out herein in conjunction with a specific description of the device in a preferred form and for the purposes of illustration. It is further to be understood that the invention is not limited to the precise details of construction or arrangement except as may be hereinafter provided in the appended claims.

Having thus described my invention, what I claim as new and desire to protect by Letters Patent is:

1. In a cutter, in combination, means providing a relatively stationary planar cutting surface, a blade carrier including an arm arranged for rotation in a plane parallel to said surface, a blade of elongated form bent in opposite directions about longitudinally extensive parallel lines between its longitudinal edges to provide offset surface portions extending in the same direction transversely of the blade, one of said offset portions being seated in said carrier so that the longitudinal edge of the remaining offset portion, which edge constitutes the cutting edge, is projected out of the plane of the carrier in advance of said arm in the direction of rotation thereof and at an acute angle in a general direction toward said cutting surface so that the thickness of the blade in the region of said cutting edge is moved in the general direction of rotation of the carrier.

2. In meat cutting devices and the like, a rotatable cutting member including a hub portion and an arm portion projecting therefrom in a radial sense, said arm portion having a leading edge portion fronting the line of rotation of said cutting member, said arm having an open blade channel extending substantially parallel to said leading edge portion and an elongated blade having a longitudinal edge portion inserted into said channel and spaced from the bottom thereof by a bend about a longitudinal line and toward said leading edge so as to dispose a mid portion of the blade at an angle to the portion in said channel to bear against said arm, said blade having a second bend parallel and opposite to said first-mentioned bend whereby the other longitudinal edge portion thereof, constituting a cutting edge, is projected in advance of said leading edge and out of the plane of said arm, together with blade retaining means in the form of an elongated spring member having an intermediate bight portion flanked by laterally projecting leg portions, said leg portions being seated in said arm so as to dispose said bight portion over said open channel for engagement with said blade in the region of said first-mentioned bend thereof, whereby the blade is held in the channel, said bight portion being movable to permit insertion or withdrawal of the blade by manual movement of the latter.

3. In meat cutting devices and the like, a rotatable cutting member including a hub portion and an arm portion projecting therefrom in a radial sense, said arm portion having a leading edge portion fronting the line of rotation of said cutting member, said arm having an open blade channel extending substantially parallel to said leading edge portion and an elongated blade having a longitudinal edge portion inserted into said channel and spaced from the bottom thereof by a bend about a longitudinal line and toward said leading edge so as to dispose a mid portion of the blade at an angle to the portion in said channel to bear against said arm, said blade having a second bend parallel and opposite to said first-mentioned bend whereby the other longitudinal edge portion thereof, constituting a cutting edge, is projected in advance of said leading edge and out of the plane of said arm, together with means in the form of an elongated spring member having a bight portion with a laterally projecting leg portion seated in said arm so as to project the bight portion over the opening of the channel for engagement with said blade in the region of the first-mentioned bend thereof, whereby the blade is releasably held in the channel, and means on said arm behind the free end portion of said spring member for limiting yielding movement of the latter.

4. In a cutter of the class described, a blade carrier having an elongated blade seating channel, and an elongated blade having a longitudinally extensive bow between its long edges and adapted to fit into said channel with the bowed portion thereof disposed close to the longitudinal opening of the channel, and blade retaining means including a bowed spring member mounted on said carrier with the bowed portion thereof normally projecting over said channel to bear against said bowed portion of the blade and holding the latter in its seat, said spring being arranged to yield to pressure of the blade to permit the latter to move into and out of said channel.

JOHN A. KLOD.